Patented May 30, 1950

2,509,579

UNITED STATES PATENT OFFICE 2,509,579

SOLID WATER ICE COMPOSITION FOR PACKING AND SHIPMENT OF FRUITS AND VEGETABLES

Jagan N. Sharma, Los Angeles, Calif.

No Drawing. Application May 11, 1946, Serial No. 669,096

1 Claim. (Cl. 252—70)

This invention relates to the refrigeration of fruits and vegetables for shipment and is particularly directed to a water ice capable of retaining its solid form for prolonged periods of time.

As is well known, various fruits and vegetables are packed under refrigeration and shipped long distances. Previously, many vegetables and fruits were picked while in a green or immature condition and permitted to ripen during shipment. Such methods of packing and shipment, however, were not conducive to the development of natural, fully mature flavors and colors in the fruits. Subsequently, therefore, a procedure was developed wherein fruits were picked in a field-ripened condition and immediately packed in containers or cars, the fruits being covered with ground or chipped ice. Finely ground ice is generally termed "snow ice" in the trade and is used quite extensively. In some instances the fruits are precooled before being placed in the cars; in other instances the fruits are washed, cleaned, and occasionally coated with a thin discontinuous film of wax or waxy material before being packed under ice.

Since fruits and vegetables are often shipped to distant points and while in transit a car of fruits or vegetables may be rerouted and its destination changed so that it is in transit for a longer period of time than that originally contemplated, the ice originally placed in the car is very often depleted while the fruits are still en route. Moreover, the amount of ice capable of being placed in heat-exchange relationship with the fruits is limited and therefore it has been found necessary to re-ice the cars at locations intermediate points of shipment and destination. The re-icing of cars while en route is not only time-consuming but expensive.

It is also to be remembered that in the event a car of fruit such as melons, for example, runs out of ice during shipment, the melons appear to mature very quickly thereafter. This is probably due to the fact that the melons are confined and the car becomes unduly warm. For this reason it is extremely important that refrigeration be maintained throughout the shipping period and a delay of even twenty-four hours may greatly impair the quality and condition of the fruit as it is received at its destination.

Some attempts have been made to utilize solid carbon dioxide as a refrigerant but great difficulties have been encountered due to the fact that solid carbon dioxide has a very low temperature and fruits and vegetables ordinarily can not be subjected to a temperature below about 31.2° F. or 31.3° F. since at such temperatures freezing takes place and the fruit becomes split and the tissues damaged.

This invention is based upon the discovery that a solid water ice may be obtained capable of retaining its frozen form for appreciably longer periods of time than normal commercial water ice, by adding to the water, prior to freezing the same into ice, a small quantity of an organic compound which is water-soluble, water-miscible, contains at least one carbonyl radical, and has a low dissociation constant. It has been found that even minute quantities of such added organic compounds exert a tremendous effect upon the keeping qualities of the ice. The temperature of the ice is not appreciably or measurably decreased and the increased keeping qualities if the ice may be due to some change in the structure of the ice.

This invention, therefore, contemplates the packing and shipment of fruits and vegetables with a solid water ice characterized by its ability to retain its frozen form for appreciably longer periods of time than normal commercial water ice, thereby permitting such fruits and vegetables to be shipped to distant points without the necessity of re-icing the cars.

It is also an object of the present invention to disclose and provide a novel form of solid ice having a melting point not materially below that of normal water ice and containing a small quantity of an added organic non-polar compound. An object of the invention is to disclose and provide a solid water ice containing fluorescein.

A still further object of the invention is to disclose and provide a method of imparting keeping qualities and structural differences to water ice.

These and other objects, advantages and uses of the present invention will become apparent from the following description.

The term "commercial water ice" as used herein refers to ice which is generally made from ordinary tap water although in some instances it is made from distilled water. Commercial ice is generally made in blocks of approximately 300 pounds each, the molds being surrounded or immersed in a bath of brine or other refrigerant. In some instances air is bubbled through the water during the initial freezing periods and until a central hollow core is left, whereupon the liquid core is sucked out and clean water is added. The manufacture of ice in accordance with the present invention does not require the use of any different or other equipment than that normally used in the manufacture of commercial ice.

In accordance with the present invention, however, there is added to the water, prior to freezing the same, an organic compound from the group consisting of water-soluble and water-miscible compounds which have a conductance of not over 10 at a concentration of 0.02 equivalent weights per litre at normal temperature of say 18° C. The term "conductance" as used herein may be identified by the symbol $\Lambda$ and is expressed in reciprocal ohms.

Fluorescein, having a molecular weight of 332.30 and negligible equivalent conductance at a concentration of 0.015 equivalent weights per litre, is eminently suited for use in the present invention.

Attention is called to the fact that all of the substances of the desired class are water-miscible and water-soluble. Moreover, all of such substances are organic compounds and are characterized by the presence of a carbonyl radical. The molecular weights vary greatly. All of the substances may be said to be of a non-polar character.

Any one or more of these substances may be added to water from which the novel ice is to be manufactured, but the quantity added should at no event exceed about 0.1% by weight and in actual practice less than 0.05% has been found adequate. Minute quantities as low as 0.0001% have given good results.

The remarkable keeping qualities of ice manufactured in accordance with this invention are illustrated by the following tests, in which ice was made from ordinary tap water from the same source, at the same time, under exactly similar conditions with the exception that the check ice contained no additive whereas ice made in accordance with the present invention contained fluorescein in the quantities indicated.

The test was conducted by crushing both lots of ice to the same extent and by the use of the same crusher. Carefully weighed quantities of both types of ice were then placed in large containers provided with perforated bottoms to permit drainage and such containers then placed into a constant temperature room maintained at 40° F. After the lapse of the stated length of time, the remaining ice was weighed and in order to check the determinations, the meltings from each lot of ice were also weighed.

|  | Original Weight | Final Weight | Elapsed Time, Days |
|---|---|---|---|
| Normal crushed ice | 1,780 | 270 | 10 |
| Crushed ice containing 0.0001% fluorescein by weight | 1,780 | 358 | 10 |
| Crushed ice containing 0.001% fluorescein by weight | 1,271 | 407 | 7 |
| Normal crushed ice | 1,271 | 103 | 7 |

It will be noted that a saving of 5.7% in weight of ice was found by the use of 0.0001% fluorescein at the end of 10 days. A saving of 16.3% in the weight of ice was found by the use of 0.001% fluorescein at the end of 7 days. Similar results showing a materially smaller loss in the form of drippings or meltage were attained by the use of the various other compounds listed hereinabove and belonging to the general class indicated.

These remarkable results were also checked by the comparison of solid blocks of ice, the check blocks being made in the normal manner out of ordinary tap water whereas other blocks were made from water to which the various non-polar organic compounds were added. When 0.001% fluorescein was used, for example, the large blocks of ice remaining at the end of a 7 day period were almost 7% greater in weight than the blocks of normal or commercial ice.

The action of these non-polar organic compounds upon the ice is not definitely understood since the quantities employed are so minute that they do not appreciably affect the freezing point and no correlation exists between the remarkable lasting qualities of the resulting ice and any theoretical depression of the freezing point of the solution. Physical, structural or crystallographic changes appear to exist in the new ice. Blocks of ice made in accordance with my invention do not split in the same way as normal ice. Ice made in accordance with the present invention is tougher and not as brittle. The ice appears to pack better.

Even by the use of the maximum quantities of added organic non-polar compounds the freezing point of the ice is not reduced below 31.8° F. Certain of the compounds, such as fluorescein and eosine, impart a distinctive coloring to the ice, which is desirable since it readily permits identification of the ice.

Cantaloups shipped from the Imperial Valley area of California to Philadelphia and New York with ice manufactured in accordance with this invention need not be re-iced in transit whereas ordinarily re-icing is conducted three or four times. A great saving both in time and in fruit is therefore accomplished by the use of the improved ice of this invention.

The cantaloups referred to hereinabove were cleaned, sprayed with a dispersion or emulsion containing waxy constituents so as to leave a discontinuous waxy film on the surface, placed in crates, and covered with the crushed ice.

Lettuce, tomatoes and various other vegetables and fruits may be packed and shipped more expeditiously and economically by the use of my ice since in many instances the total quantity of ice may be reduced from that normally used in packing the vegetables. Obviously, a lettuce crate need not be filled with as much ice as is usually the case when my ice will maintain the contents in a suitable refrigerated condition with a smaller quantity of ice. All changes and modifications coming within the scope of the appended claim are embraced thereby.

I claim:

A solid water ice having a melting point not below 31° F. and having the ability to retain its form for appreciably longer periods of time than normal commercial ice, said ice containing between 0.0001% and 0.1% by weight of fluorescein.

JAGAN N. SHARMA.

REFERENCES CITED

The following references are of record in the file of this patent:

UNITED STATES PATENTS

| Number | Name | Date |
|---|---|---|
| 2,203,230 | Nitsche | June 4, 1940 |

OTHER REFERENCES

Taylor, "Refrigeration of Fish," Department of Commerce, Bureau of Fisheries Document No. 1016 (1927), page 264.